United States Patent
Tan et al.

(10) Patent No.: US 9,665,215 B2
(45) Date of Patent: May 30, 2017

(54) METHOD AND CIRCUIT FOR PARASITIC CAPACITANCE CANCELLATION FOR SELF CAPACITANCE SENSING

(71) Applicant: STMicroelectronics Asia Pacific Pte. Ltd., Singapore (SG)

(72) Inventors: Sze-Kwang Tan, Singapore (SG); Yannick Guedon, Mimosa Park (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 590 days.

(21) Appl. No.: 13/853,887

(22) Filed: Mar. 29, 2013

(65) Prior Publication Data

US 2014/0292705 A1  Oct. 2, 2014

(51) Int. Cl.
*G06F 3/041* (2006.01)
*G06F 3/044* (2006.01)

(52) U.S. Cl.
CPC ............ *G06F 3/044* (2013.01); *G06F 3/0418* (2013.01)

(58) Field of Classification Search
CPC .......... G06F 3/044; G06F 3/041; G06F 3/045; G06F 3/0418; G09G 3/36

USPC ................. 345/174, 175, 173, 98; 178/18.06
See application file for complete search history.

(56) References Cited

U.S. PATENT DOCUMENTS

| | | | |
|---|---|---|---|
| 2008/0018581 A1* | 1/2008 | Park ..................... | G06F 3/0412 345/98 |
| 2011/0186359 A1* | 8/2011 | Chen et al. ................ | 178/18.06 |
| 2011/0261006 A1* | 10/2011 | Joharapurkar et al. ....... | 345/174 |
| 2012/0218222 A1* | 8/2012 | Shen et al. .................... | 345/174 |

* cited by examiner

*Primary Examiner* — Jonathan Boyd
(74) *Attorney, Agent, or Firm* — Gardere Wynne Sewell LLP (57) ABSTRACT

Apparatus and methods to measure capacitance changes for a touch-sensitive capacitive matrix are described. Charge-removal circuits and measurement techniques may be employed to cancel deleterious effects of parasitic capacitances in the touch-sensitive capacitive matrix. Capacitively switching a supply during timed charge removal may be used to cancel unwanted effects due to clock jitter. The apparatus and methods can improve signal-to-noise characteristics, sensitivity, and/or dynamic range for capacitive measurements relating to touch-sensitive capacitive devices.

30 Claims, 8 Drawing Sheets

METHOD AND CIRCUIT FOR PARASITIC CAPACITANCE CANCELLATION FOR SELF CAPACITANCE SENSING

BACKGROUND

Technical Field

The technology relates to touch-sensitive capacitive matrices that are used to enable touch control of electronic devices. The technology further relates to cancelling parasitic capacitance effects in such touch-sensitive capacitive matrices.

Discussion of the Related Art

A touch-sensitive capacitive matrix may be incorporated into a pad or tablet-like element, and can detect an object in contact with or in proximity to the pad. The element may be part of an electronic device that includes at least one processor configured to operate the device. Because the capacitive sensors of a capacitive matrix are disposed in a two-dimensional array in the pad or tablet-like element, the location on the on the element at which the object touches or is in proximity to the element can be ascertained.

Touch-sensitive capacitive matrices have been incorporated into display screens of smart electronic apparatuses (e.g., into displays of smart phones, computers, net books, personal digital assistants, tablets, etc.) to provide a convenient method for users to interact with the apparatuses. Such a display is sometimes referred to as a "touch screen." The display area may be covered with a touch-sensitive capacitive matrix that can detect a user's touch by way of a finger or stylus, for example. A touch screen may enable various types of user input, such as touch selection of items on the screen, alphanumeric input via a displayed virtual keypad, scrolling operation, and scaling operations (e.g., zoom in/zoom out). Touch screens may also be used to detect various parameters of the user's touch, such as one or more locations of contact, size of a contact area, and duration of contact. The terms "touch" and "contact" when used herein to refer to touch control is meant to include physical contact as well as proximal positioning of a controlling object (e.g., a finger, a stylus) with respect to a touch-sensitive capacitive matrix. It will be understood that physical contact and proximal position may each affect a response in a touch-sensitive capacitive matrix.

Figure 1:
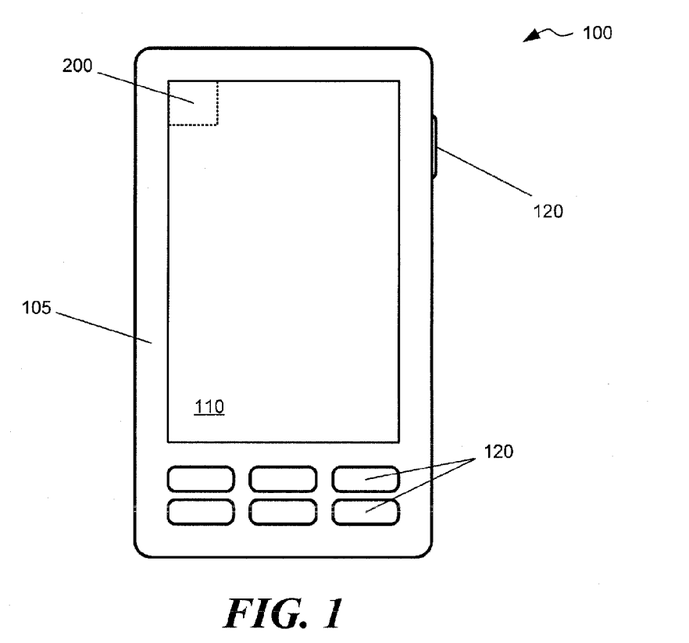
FIG. 1 illustrates an embodiment of a smart electronic device that may include a touch-sensitive capacitive matrix in a display screen.

One example of an electronic device 100 that may include a touch-sensitive capacitive matrix is shown in FIG. 1. The device shown in FIG. 1 may be a smart phone, for example, and include a display screen 110 and one or more push-style control buttons 120. The display screen may be configured as a touch screen. Inside a casing 105 may be electrical circuitry, hardware, at least one processor, memory storing machine-readable instructions operable on the at least one processor, and a power source (e.g., a rechargeable battery). The device 100 may further include wireless communication electronics, one or more motion-sensors, GPS circuitry, and a magnetometer.

SUMMARY

Apparatus and methods for cancelling parasitic capacitances associated with touch-sensitive capacitive matrices are described. Parasitic capacitances may exist for each pixel element and/or sense line in a touch-sensitive capacitive matrix, and contribute noise to signals derived from each pixel element. In various embodiments, current sources are included in a touch-sensitive capacitive matrix, and are configured to remove charge from the parasitic capacitances. Additionally, a supply circuit for the current sources is configured to cancel undesirable current variations during charge removal due to clock jitter.

According to an embodiment, an electronic device comprises a touch-sensitive capacitive matrix having a plurality of force channels and a plurality of sense channels that are used for capacitive measurements to detect touch of the touch-sensitive capacitive matrix. The device may further include an output amplifier configured to be coupled to and decoupled from at least one sense channel of the plurality of sense channels, and a charge removal circuit configured to apply a current to the at least one sense channel for a predetermined amount of time so as to cancel parasitic charge associated with the at least one sense channel.

According to some embodiments, a method for measuring capacitance at a sense channel of an electronic device, wherein a parasitic capacitance is associated with the sense channel, may comprise applying a first voltage to the sense channel, and connecting a current source to the sense channel. The method may further include applying a current from the current source to the sense channel for a predetermined amount of time so as to cancel a parasitic charge associated with the parasitic capacitance.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing.

DETAILED DESCRIPTION

Referring again to FIG. 1, a touch-sensitive capacitive matrix may be incorporated into a display screen of an electronic device to form a touch screen 110. According to one embodiment, a touch screen that utilizes a capacitive matrix may include arrays of conductive rows and conductive columns integrated in the display area. The conductive rows and columns may be formed in the display as sub-millimeter conductive traces or wires that are barely visible or not visible to the unaided eye. The conductive rows and columns may not contact each other, but may be in close proximity to each other.

Figure 2:
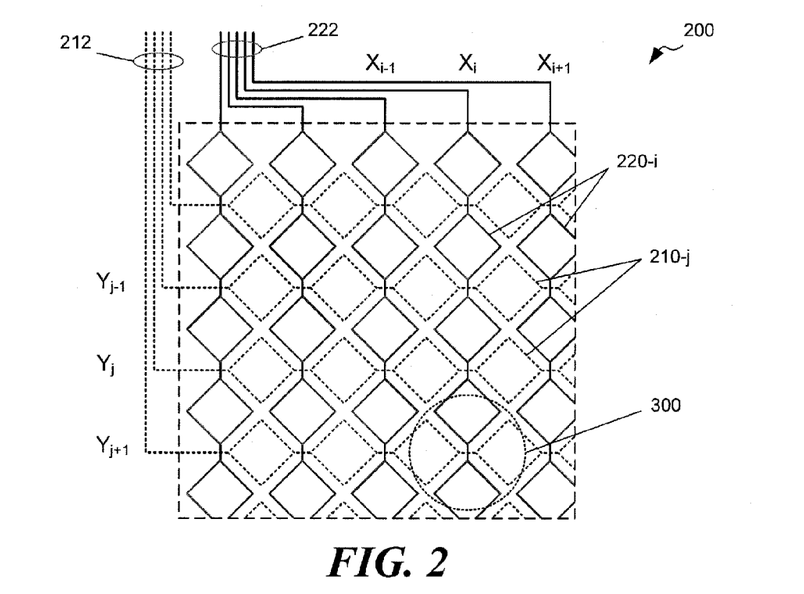
FIG. 2 depicts a portion of a touch-sensitive capacitive matrix, according to an embodiment.

One embodiment of conductive rows 210-$j$ and conductive columns 220-$i$ is depicted in FIG. 2. Only a portion 200 of the touch-sensitive capacitive matrix, e.g., a portion indicated by the dashed box in FIG. 1, is shown in FIG. 2. In this embodiment, the conductive rows and columns are configured as a transparent diamond matrix. The conductive traces for each row 210-$j$ (illustrated using dashed lines) may define an array of interconnected shapes. Similarly, the conductive traces for each column 220-$i$ (illustrated using solid lines) may define an array of interconnected shapes. The shapes may only be outlined by the traces and not filled. Although each shape within a row is electrically connected by conductive traces, there is no conductive connection between an element of a row and an element of a column in the capacitive matrix. There may be lead lines 212, 222 for accessing each row and column of conducting traces.

The conductive rows 210-$j$ may be formed at a first level, and the conductive columns 220-$i$ may be formed at a second level on the touch screen. The first level and second level may be electrically insulated from each other. In some embodiments, the transparent diamond matrix may be formed on a surface of the touch-screen 110. In some embodiments, the transparent diamond matrix may be formed proximal the surface of the touch screen 110, e.g., formed at one or more levels within the touch screen.

Figure 3:
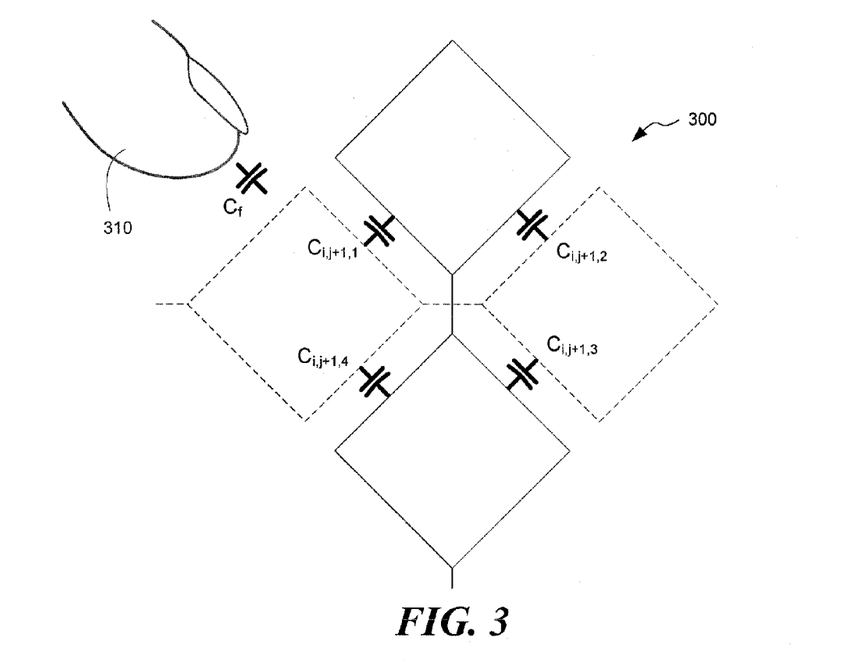
FIG. 3 depicts mutual capacitances at a pixel element of a touch-sensitive capacitive matrix, according to an embodiment.

The conductive rows 210-$j$ and conductive columns 210-$i$ may define a plurality of pixel elements 300, shown in greater detail in FIG. 3. A pixel element may comprise four proximal shaped structures at an intersection of a row and column (e.g., row $Y_{j+1}$ and column $X_i$). The four proximal shaped structures may exhibit mutual capacitances. The mutual capacitances are illustrated in FIG. 3 as capacitances $C_{i,j+1,1}$, $C_{1,j+1,2}$, $C_{1,j+1,3}$, and $C_{1,j+1,4}$. The illustrated capacitances are for modeling purposes only, and there may be no structure in addition to the shaped structures implemented to form a capacitor. In the illustrated embodiment, the parallel traces of the row and column conductors form the capacitive structures for a pixel element 300. In addition to the mutual capacitances, an object (e.g., a finger 310) contacting the pixel element 300 may contribute an additional capacitance $C_f$ at the pixel element. Detecting touch in a touch-sensitive capacitive matrix comprises sensing for changes in capacitance at each pixel element 300.

Although diamond-shaped structures are shown for the conductive traces in FIGS. 2-3, any other suitable shape may be used to form the capacitive structures. In some embodiments, transparent conductive films (e.g., ribbons) disposed at different overlapping levels may be used that cover a significant portion of the area of each pixel. In some cases, the diamond shapes may not be offset in a lateral direction, as indicated in FIG. 2. Instead, edges of diamond structures for a first level (e.g., at a row) may overlap in a vertical direction with edges of diamond structures for a second level (e.g., at a column).

There are at least two methods by which changes in capacitance may be sensed for a capacitive matrix. A first method comprises "mutual capacitance sensing," in which changes in mutual capacitance (e.g., between row and column structures) at a pixel is sensed. A second method comprises "self capacitance sensing," in which a change in capacitance of a conductive element of a pixel, with respect to some reference, is sensed. This disclosure is directed to self capacitance sensing circuits, although the embodiments should not be limited to only self capacitance sensing circuits.

Figure 4:
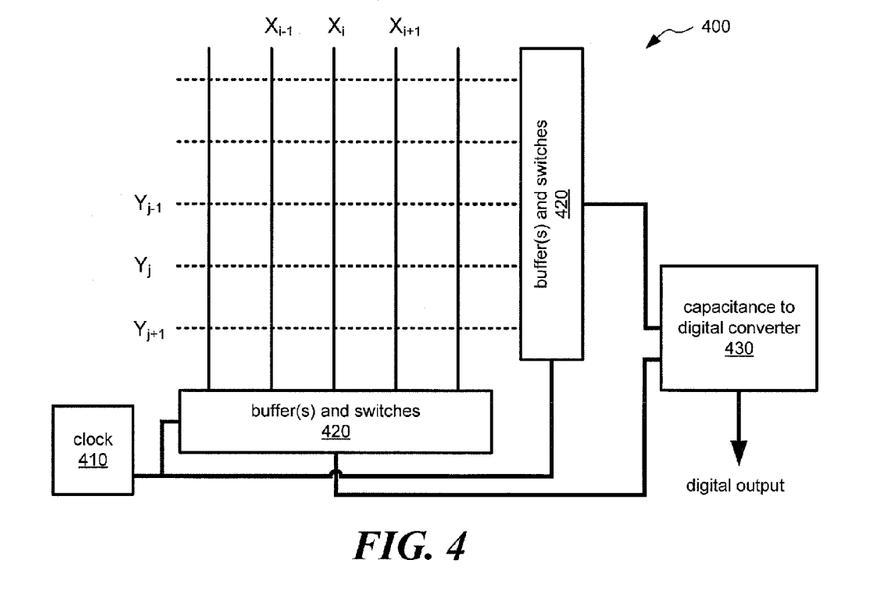
FIG. 4 depicts control circuitry for operating rows and columns of a touch-sensitive capacitive matrix, according to an embodiment.

One embodiment of control circuitry 400 for operating a touch-sensitive capacitance matrix is depicted in FIG. 4. To simplify the drawing, the touch-sensitive capacitance matrix is illustrated as an array of intersecting conductive rows (straight dashed line) and conducting columns (straight solid lines) that are intended to represent more complex conductive trace structures, e.g., the transparent diamond matrix. The control circuitry 400 may comprise buffer and switch circuitry 420 and at least one capacitance-to-digital converter 430. Although one capacitance-to-digital converter 430 is shown in FIG. 4, in some embodiments a first capacitance-to-digital converter may be dedicated to signals from rows, and a second capacitance-to-digital converter may be dedicated to signals from columns. The control circuitry 400 may include a clock 410 or an input configured to receive a clock signal.

For self capacitance sensing, columns of the touch-sensitive capacitance matrix may be "forced" and rows may be sequentially "sensed" to detect capacitance changes at each pixel element of the touch-sensitive capacitance matrix. The sensing of changes at a pixel element may occur at an intersection of at least one forced column and at least one sensed row for which an object touches the capacitive matrix. According to some embodiments, in a first measurement phase, all columns may be forced at a same time, while all rows are sensed to determine one or more rows that have been "touched." In a second measurement phase, all rows may be forced at a same time, while all columns are sensed to determine one or more columns that have been "touched." The results of the row and column determinations can be combined to yield the X, Y coordinates of at least one touching location. In some implementations, the forcing and/or sensing of columns and rows may be done sequentially.

The forcing of a column may comprise applying at least one voltage to the column, and the sensing of a row may comprise making at least one capacitive measurement for the row. Buffer and switch circuitry 420 may be used to select an active column and row, and to amplify signals provided to or received from the selected column and row. The sensed signal may be provided to the capacitance-to-digital converter 430 that provides a digital output signal, in digital format for each pixel, representative of capacitance changes for that pixel. In some embodiments, the capacitance-to-digital converter 430 may be implemented using an analog-to-digital converter that may convert a voltage, representative of a capacitance change, into a digital signal. A clock signal from clock 410 may be used to operate switches in the buffer and switch circuitry 420, so that the columns and rows are strobed to access each pixel of the touch-sensitive capacitance matrix. Although the embodiment described above notes that columns are forced and rows are sensed, other embodiments may be implemented for which rows are force and columns are sensed.

Figure 5A:
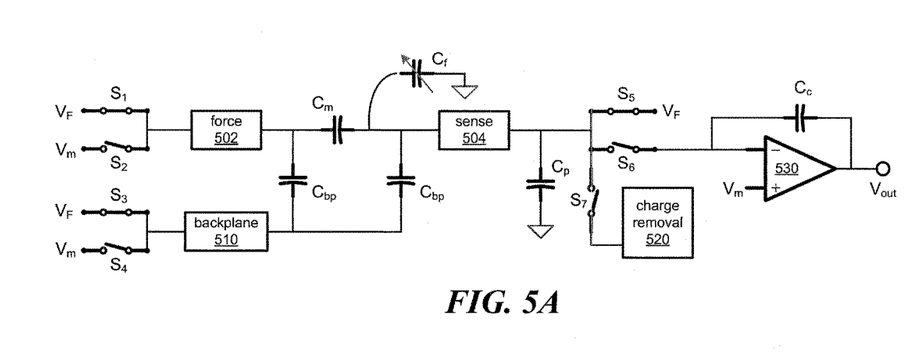
FIG. 5A depicts further details of control circuitry for driving a portion of a touch-sensitive capacitive matrix during a pre-charge phase, according to an embodiment.
Figure 5B:
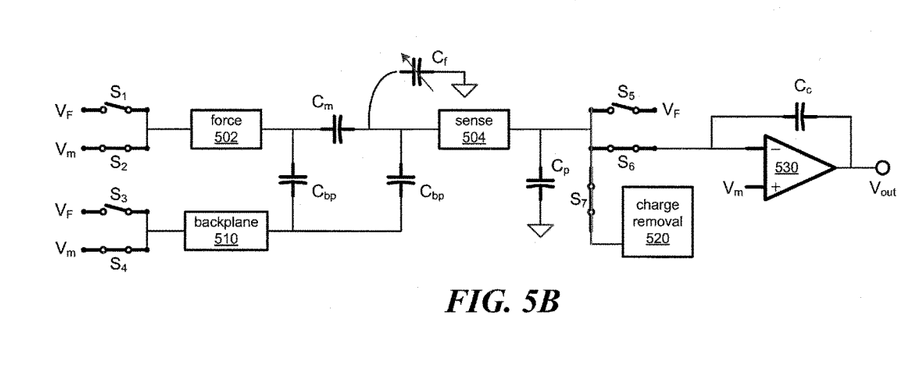
FIG. 5B depicts further details of control circuitry for driving a portion of a touch-sensitive capacitive matrix during a measurement phase, according to an embodiment.

FIGS. 5A and 5B show one embodiment of a portion of the control circuitry 400 in further detail, at two phases of operation. Circuitry is shown for one column and row. The circuitry may be replicated when there are multiple columns and rows in a device. Some elements of the circuitry may be shared among plural columns and/or rows. In a first phase, FIG. 5A, the portion of control circuitry is configured in a pre-charge state. In a second phase, FIG. 5B, the portion of control circuitry is configured in a measurement state.

According to some embodiments, the control circuitry 400 may comprise switches $S_1$, $S_2$ for forcing a force channel 502 (e.g., column $X_i$) to a forcing voltage value $V_F$ during the pre-charge phase, and to a second voltage value $V_m$ during a measurement phase. The control circuitry 400 may further include switches $S_3$, $S_4$ for forcing a backplane 510 of the touch screen to the forcing voltage value $V_F$ during the pre-charge phase, and to the second voltage value $V_m$ during a measurement phase. The control circuitry 400 may further include switches $S_5$, $S_6$ for driving a sense channel 504 (e.g., row $Y_j$) to the forcing voltage value $V_F$ during the pre-charge phase, and to couple the sense channel to an amplifier 530 during a measurement phase. Control circuitry 400 may further comprise switch $S_7$ configured to couple and decouple sense channel 504 to and from charge removal circuitry 520. Switches $S_1$-$S_7$ may be implemented as transistors, e.g., MOSFETs. Switches $S_1$-$S_7$ may be included in buffer and switch circuitry 420.

Amplifier 530 may be any suitable type of amplifier having inverting and non-inverting inputs. Amplifier 530 may be an operational amplifier. Amplifier 530 may be included in capacitance-to-digital converter 430. According to some embodiments, an integrating capacitor $C_c$ is connected between an output of the amplifier and its inverting input. The inverting input may also be arranged to receive an input signal from at least one sense channel 504. The second reference voltage $V_m$ may be connected to the non-inverting input of the amplifier 530. In some embodiments, switching circuitry (not shown) may be arranged to switch the inverting input of amplifier 530 between a plurality of sense channels.

As noted above in connection with FIG. 3, each pixel element of a touch-sensitive capacitance matrix will have mutual capacitances. In FIGS. 5A-5B, the mutual capacitances are represented as $C_m$. For example, $C_m$ is a combination of $C_{i,j+1,1}$, $C_{i,j+1,2}$, $C_{i,j+1,3}$, and $C_{i,j+1,4}$. Additionally, each conductive row and conductive column may exhibit capacitance $C_{bp}$ with respect to a conductive backplane of the capacitive matrix. Although shown as a same capacitance in the drawings, the capacitance between a row and backplane may be different than a capacitance between a column and backplane. The presence of a touch-control object (e.g., a finger) at a pixel may contribute an additional capacitance $C_f$ that can be detected at a sense channel 504.

Each sense channel 504 may further include a parasitic capacitance $C_p$. The parasitic capacitance may be due to one or more elements (not shown in the drawings) connected to the sense channel (e.g., protection diodes, transistors, trace routing) and to one or more fixed reference potentials. The parasitic capacitance $C_p$ can contribute undesirable charge and noise signal to capacitive measurements made at a sense channel 504. This can be better understood by reviewing the operation of the circuitry shown in FIGS. 5A and 5B.

In operation and during the pre-charge phase shown in FIG. 5A, the switches $S_1$-$S_7$ are configured to apply the same potential $V_F$ to both sides of capacitances $C_m$ and $C_{bp}$. Since the same potential is applied to both nodes of these capacitances, no charge will accumulate in these capacitors. However, charge will accumulate for capacitors $C_f$ and $C_p$.

During the measurement phase shown in FIG. 5B, the switches $S_1$-$S_7$ are configured to apply the second reference potential $V_m$ to both sides of capacitances $C_m$ and $C_{bp}$. The sense channel is driven to $V_m$ by the virtual reference at the amplifier 530. An amount of unwanted charge $Q_n$ on the parasitic capacitor at the time of measurement may be determined according to the following equation.

$$Q_n \approx (V_F - V_m)/C_p \qquad (1)$$

The charge $Q_n$ does not contain any information representative of touch control. In some cases, can be an appreciable amount of charge, comparable to or larger than charge associated with $C_f$. The presence of $Q_n$ can therefore reduce the dynamic range of the capacitive measurement.

To mitigate the effects of $Q_n$, and to improve the dynamic range of capacitive measurements in the touch-sensitive matrix, charge removal circuitry 520 is added to control circuitry 400. In some embodiments, parasitic capacitance $C_p$ for each pixel may be substantially constant over time for each pixel of a touch-sensitive capacitive matrix. Since $V_F$ and $V_m$ are known and $C_p$ is fixed, the amount of charge $Q_n$ that would accumulate at the parasitic capacitance during a measurement can be determined from a calibration phase for each pixel, and the measured amounts can be subtracted (removed) from each sense channel during capacitive measurements for each pixel. Charge removal circuitry 520 may be configured to remove a predetermined amount of charge $Q_n$ for each pixel so as to cancel the unwanted charge accumulated at the parasitic capacitance $C_p$ from the capacitive measurements. In some embodiments, charge removal circuitry 520 may be added to each sense channel in a capacitive matrix. Values of $Q_n$ for each pixel may be stored in memory accessible by control circuitry 400.

Methods for storing and applying compensating values of capacitance during capacitive measurements for touch-sensitive capacitive matrices are described in co-pending U.S. application Ser. No. 13/629,877, titled "COMPENSATION FOR VARIATIONS IN A CAPACITIVE SENSE MATRIX," and filed on Sep. 28, 2012, which is incorporated herein by reference in its entirety. In some embodiments, these methods for storing and applying compensating values of capacitances may be used to control, on a pixel-by-pixel basis, the amount of charge removed from a sensing pixel by charge removal circuitry 520.

Once $C_p$ or $Q_n$ has been compensated, the capacitive measurement for the pixel will be substantially attributed to $C_f$. The output from amplifier 530 may then be given by the following equation.

$$V_{out} = -(V_F - V_m) \times C_f / C_c \qquad (2)$$

The detected voltage may then be converted to a digital signal to provide a signal representative of touch control at the sensing pixel. In some implementations, $V_{out}$ may be compared against a threshold value to determine one of two states: touch control detected, or touch control not detected. Each state may be represented by a digital 1 or 0 value. In other implementations, a range of values for $V_{out}$ may be measured for each pixel and provided as multi-bit digital data.

There may be one or more charge removal circuits 520 for a touch-sensitive capacitive matrix. In some embodiments, one charge removal circuit 520 may be used to compensate charge for a plurality of pixels, e.g., in implementations where the plurality of pixels are scanned serially. In some embodiments, each pixel, row of pixels, or column of pixels may be associated with a respective charge removal circuit 520, e.g., in implementations where a plurality of pixels are scanned in parallel.

Figure 6A:
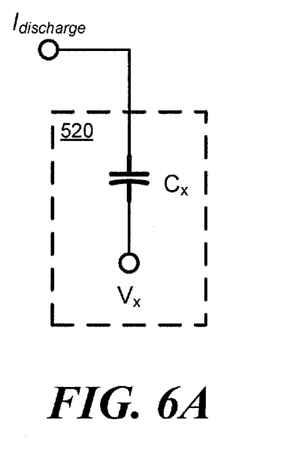
FIGS. 6A-6C depict embodiments of charge removal circuitry 520.
Figure 6B:
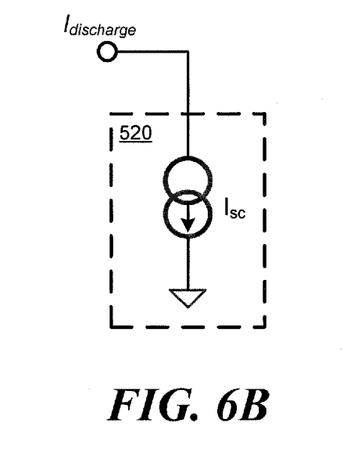
Figure 6C:
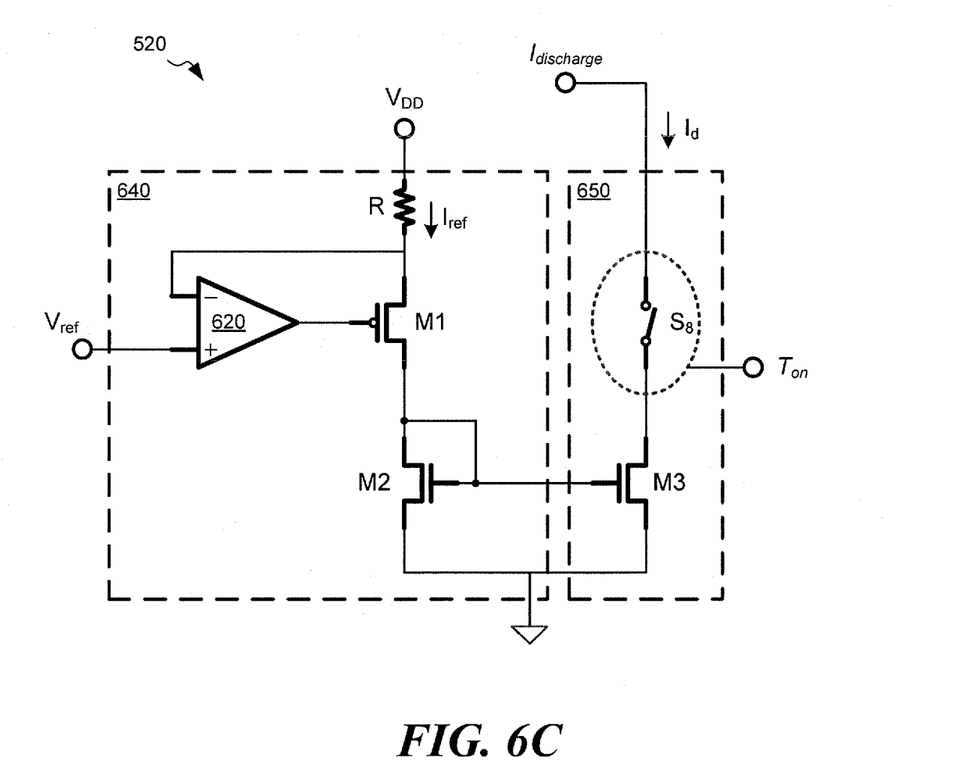

Various embodiments of charge removal circuitry 520 are shown in FIGS. 6A-6C. According to some embodiments, charge removal circuitry 520 may comprise a compensating capacitor $C_x$ configured to be connected to a compensating voltage $V_x$, as shown in FIG. 6A. Either one or both of the compensating capacitor $C_x$ and compensating voltage $V_x$ may be programmable, e.g., set from memory by a controller (not shown). The values for $C_x$ and/or $V_x$ may be determined for each pixel during a calibration phase for the touch-sensitive capacitive matrix, and subsequently applied during measurement phases.

In some implementations, $V_x$ may be fixed and $C_x$ programmable. In such an implementation, the value for $C_x$ may be determined using the following relation.

$$C_x = C_p \times (V_F - V_m)/V_x \quad (3)$$

Applying $C_x$ and $V_x$ during a measurement phase for a pixel will cancel unwanted effects from the parasitic capacitance $C_p$, so that the output voltage $V_{out}$ will be given by EQ. 2. Accordingly, the output voltage will be proportional to the capacitance $C_f$ introduced by a touching or proximal object, e.g., a finger 310.

Although the circuitry shown in FIG. 6A may be suitable for some applications, it may have disadvantages in other applications. In some implementations of a touch-sensitive capacitive matrix, the parasitic capacitance for a pixel can range between about 50 pF and about 250 pF. Based on EQ. 3, if $V_x$ is of the same magnitude as $(V_F - V_m)$, then $C_x$ will be of the same magnitude as $C_p$. Even if $V_x$ were twice the value of $(V_F - V_m)$, $C_x$ would be in a range between about 12 pF and about 125 pF. Some touch-sensitive capacitive matrices may have many sensing channels operating in parallel, so that many charge removal circuits 520 (and compensating capacitors $C_x$) are needed. A plurality of compensating capacitors C, having values between about 25 pF and 250 pF can consume appreciable silicon real estate, and may therefore be undesirable.

Additionally, if a high granularity or resolution of capacitance compensation is desired, a large number of control lines and incrementally sized capacitors may be needed. For example, if a value of a compensating capacitor $C_x$ is to be adjusted in 50 fF increments between 25 pF and 125 pF, 2000 digital steps may be required. This in turn may require about 11 control lines and a significant plurality of smaller capacitive elements that can be added to $C_x$. In some touch-sensitive capacitive matrices with multiple sense channels, capacitive control of $C_x$ can lead to a large number of signal lines between analog and digital circuitry of the device.

According to some embodiments, charge removal circuitry 520 may be implemented as a controlled current source $I_{sc}$ connected to a reference potential, as depicted in FIG. 6B. In such embodiments, the charge removal circuitry is configured to apply a current (positive or negative) to a sense channel 504 for a predetermined amount of time so as to cancel parasitic charge that accumulates at parasitic capacitance $C_p$. The current source may be a constant current source in some embodiments, or a variable current source in other embodiments. In some implementations, a constant current source may be used and turned on for a predetermined amount of time to remove a charge $Q_n$ associated with parasitic capacitance $C_p$. The amount of charge removed $Q_r$ will be determined by the "on" time $T_{on}$ of the current source and the value of current flowing $I_{sc}$ during the "on" time. For a constant current source, $$Q_r = I_{sc} \times T_{on}. \quad (4)$$

FIG. 6C shows an embodiment of charge removal circuitry 520 that may be used in some embodiments of a touch-sensitive capacitive matrix. The embodiment shown in FIG. 6C comprises a common circuit 640 and a discharge circuit 650. The charge removal circuitry 520 of FIG. 6C comprises a current mirror, that includes transistors M2 and M3, and a time-controlled switch $S_8$, which may be implemented using a transistor. In some embodiments, switch $S_8$ may be configured to switch between an "on" state (to discharge current $I_d$) and an "off" or open state, as depicted. In some embodiments, switch $S_8$ may be configured to switch between an "on" state (to apply discharge current $I_d$) and an "idle" state (not shown) in which a node of M3 is connected to a resistor and/or supply so as to prevent charge build-up across transistor M3. The current mirror formed by transistors M2 and M3 may have a gain factor G that may be less than 1, approximately 1, or greater than 1. In some implementations, the gain G may be programmable.

Supply circuitry comprising an amplifier 620, resistor R, and transistor M1, and voltage supply $V_{DD}$ may be arranged to provide a current $I_{ref}$ to the current mirror. A non-inverting input of amplifier 620 may be connected to a reference potential $V_{ref}$ and an inverting input of amplifier 620 may be connected to a node between resistor R and transistor M1 as shown. The value of current $I_{ref}$ is $(V_{DD} - V_{ref})/R$. Therefore, the discharge current $I_d$ may be given by the following expression.

$$I_d = G \times (V_{DD} - V_{ref})/R \quad (5)$$

The switch $S_8$ may be controlled by logic that sets an "on" time $T_{on}$ for switch $S_8$ based on a count value M (e.g., a count value held in a memory register) and a clock period $T_{ck}$. The clock period $T_{ck}$ may be derived from a system clock (e.g., a multiple or fraction of a period of the system clock), or may be the period of the system clock. Combining EQS. 4 and 5, the amount of charge removal may be given by the following equation.

$$Q_r = [G \times (V_{DD} - V_{ref})/R] \times M \times T_{ck} \quad (6)$$

Therefore, removal of unwanted parasitic charge $Q_n$ for a pixel of a touch-sensitive capacitive matrix can be achieved using the charge removal circuitry 520 of FIG. 6C by determining a count value M during a calibration phase (such that $Q_r = Q_n$), and applying that count value during measurement phases.

In some implementations, common circuit 640 may be shared by all sensing channels in a touch-sensitive capacitive matrix. The discharge circuit 650 may be present (replicated) for each sensing channel in some embodiments. For example, a multiplexor or switching circuit (not shown in FIG. 6C) may selectively couple the gate node of the first transistor M2 of the current mirror to a second transistor M3 in each discharge circuit 650. In some implementations, the gate node of the first transistor M2 may be coupled simultaneously to plural second transistors in each discharge circuit 650 without a multiplexor or switching circuit.

Since the discharge circuit 650 may comprise only a few transistors, it may consume significantly less silicon real estate than charge removal circuitry based on compensating capacitors $C_x$. Discharge circuit 650 may include only one control line to operate switch $S_8$. In some embodiments, charge removal circuitry 520 of FIG. 6C may include two control lines to program the gain G of the current mirror M2-M3.

As indicated in EQ. 6, the amount of charge removal depends upon the clock period $T_{ck}$ or clock frequency $f_{ck} = 1/T_{ck}$. If the clock has any jitter, than there may be fluctuations in the clock period. These fluctuations can result in variations in the amount of charge removed $Q_r$, so that the parasitic charge $Q_n$ may not be correctly cancelled for each capacitive measurement. Clock jitter can then lead to noise in the measured output signal $V_{out}$, and reduce the signal-to-noise ratio for capacitive measurements.

Figure 7:
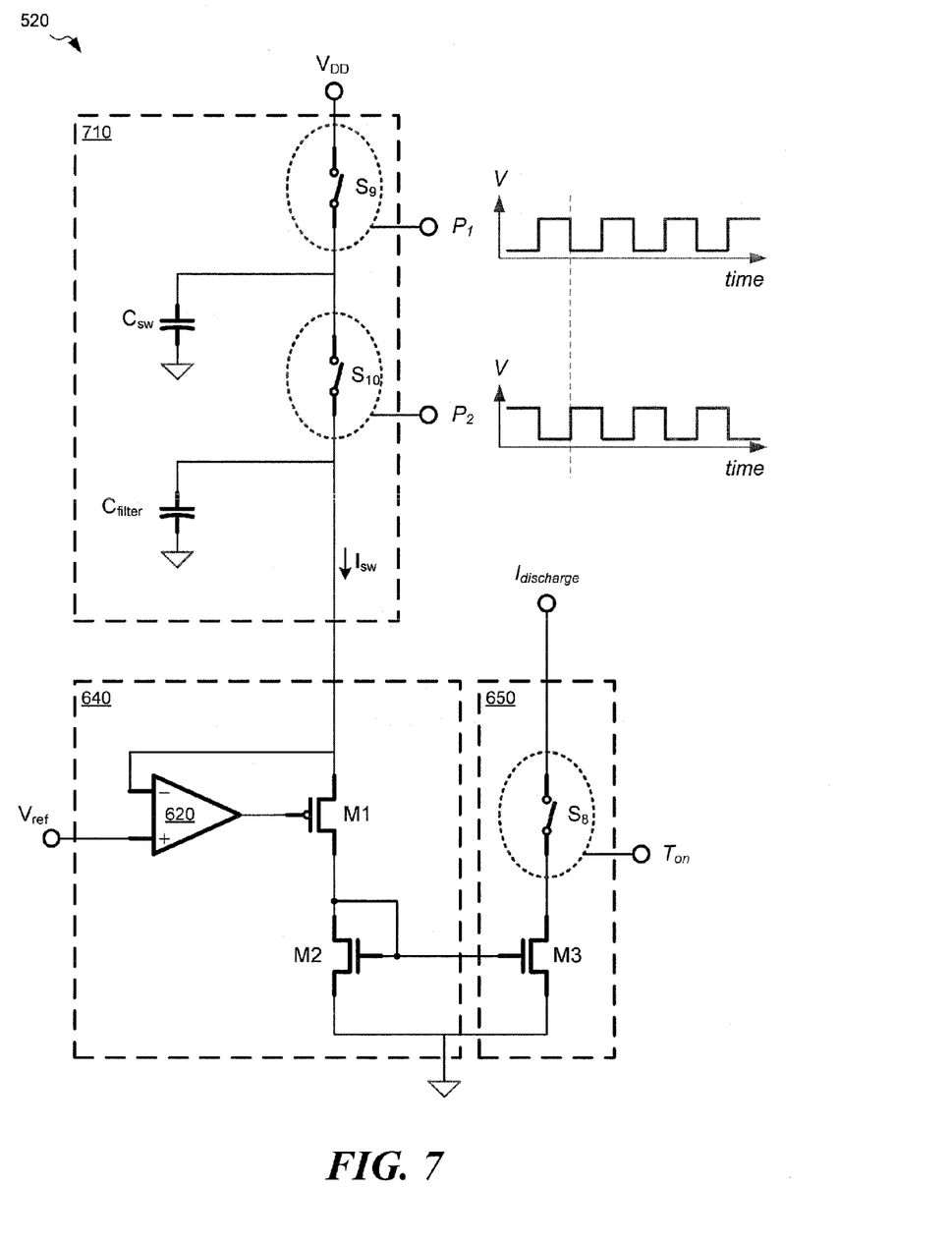
FIG. 7 depicts current supply circuitry combined with charge removal circuitry, according to an embodiment.

To mitigate the effect of clock jitter, switched-capacitive supply circuitry 710 may be added to the supply of charge removal circuitry 520 as shown in FIG. 7. The switched-capacitive supply circuitry may replace the resistor R shown in FIG. 6C, in some embodiments. Switched-capacitive supply circuitry 710 may comprise a first switch $S_9$ connected in series with a second switch $S_{10}$ between a supply $V_{DD}$ and a current node of transistor M1. Switched-capacitive supply circuitry 710 may further comprise a switching capacitor $C_{sw}$ and a filter capacitor $C_{filter}$. The switching capacitor $C_{sw}$ may be connected between a reference supply and a node between switches $C_9$ and $C_{10}$. Filter capacitor $C_{filter}$ may be connected between a reference supply and a node between switch $S_{10}$ and the current node of transistor M1. Filter capacitor $C_{filter}$ may be sized to reduce ripple.

In operation, switches $S_9$ and $S_{10}$ may be driven by pulse signals of opposite phase, as depicted in the drawing. With signal P1 low and P2 high, switching capacitor $C_{sw}$ may be charged to $V_{DD}$. With signal P1 high and P2 low, switching capacitor $C_{sw}$ may be discharged to $V_{ref}$ by virtual reference at amplifier 620. Accordingly, the switched-capacitive supply circuitry 710 may generate a switched current $I_{sw}$ given by the following expression.

$$I_{sw} = C_{sw} \times (V_{DD} - V_{ref}) \times 2/T_{ck} \tag{7}$$

The switched current $I_{sw}$ may be provided as the reference current $I_{ref}$ for the current mirror M2-M3 in charge removal circuitry 520. Combining the above results for EQS. 5-7, the amount of charge removed $Q_r$ can be expressed by the following equation.

$$Q_r = G \times C_{sw} \times (V_{DD} - V_{ref}) \times (2/T_{ck}) \times M \times T_{ck} \tag{8}$$

As can be seen in EQ. 8, the dependency of removed charge on clock period, or clock oscillation frequency, is cancelled, so that undesirable jitter noise is cancelled to first order. The reduction in jitter noise can improve SNR quality of capacitive measurements for a touch-sensitive capacitive matrix.

In some embodiments, signal levels from capacitive measurements may be improved using different pre-charge and measurement phases than those indicated in FIGS. 5A and 5B. For the pre-charge and measurement phases shown in FIGS. 5A and 5B, it can be seen that any contribution from parasitic charge present due to parasitic capacitance $C_p$ will be amplified by amplifier 530 at the instant switch $S_6$ closes. Initially, $V_{out}$ may be of a first magnitude that includes contributions from $C_f$ and $C_p$. Then, $V_{out}$ may decrease to a second magnitude as parasitic charge is removed from $C_p$ by the charge removal circuitry 520. $V_{out}$ may then be read by read-out circuitry (not shown) after removal of the parasitic charge.

To prevent amplifier 530 from clipping or saturating during the measurement phase, the value of $C_c$ needs to be increased to accommodate the initial charge of $C_p$. For example, $C_c$ may be sized according to the following relation, $$C_c \approx (C_p + C_f) \times (V_F - V_m)/V_{max} \tag{9}$$

where $V_{max}$ is given by $(V_{r+} - V_m)$ or $(V_m - V_{r-})$. $V_{r+}$ and $V_{r-}$ may be positive and negative rail supply voltages for amplifier 530. According to EQ. 9, the value of $C_c$ may be on the order of the value of $C_p$, e.g., within a factor of about 4.

For some touch-sensitive capacitive matrices, capacitance $C_f$ introduced by a finger can be appreciably smaller than the parasitic capacitance $C_p$ associated with a pixel. Because $C_c$ may need to be increased according to EQ. 10, the output voltage $V_{out}$ may be reduced in magnitude by the ratio $C_f/C_c$ according to EQ. 2.

Figure 8A:
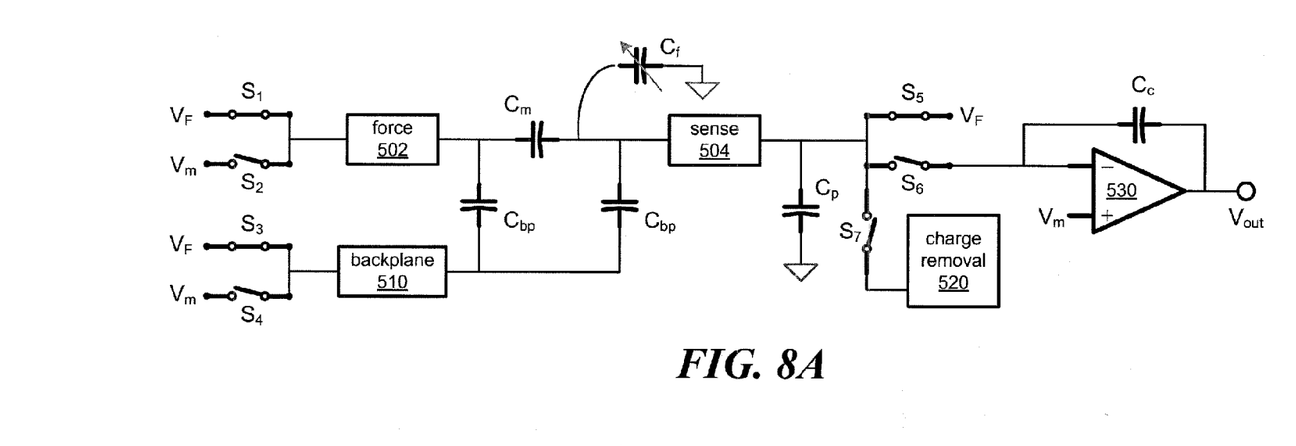
FIGS. 8A-8C depict multi-phase operation of control circuitry for driving a portion of a touch-sensitive capacitive matrix, according to an embodiment.
Figure 8B:
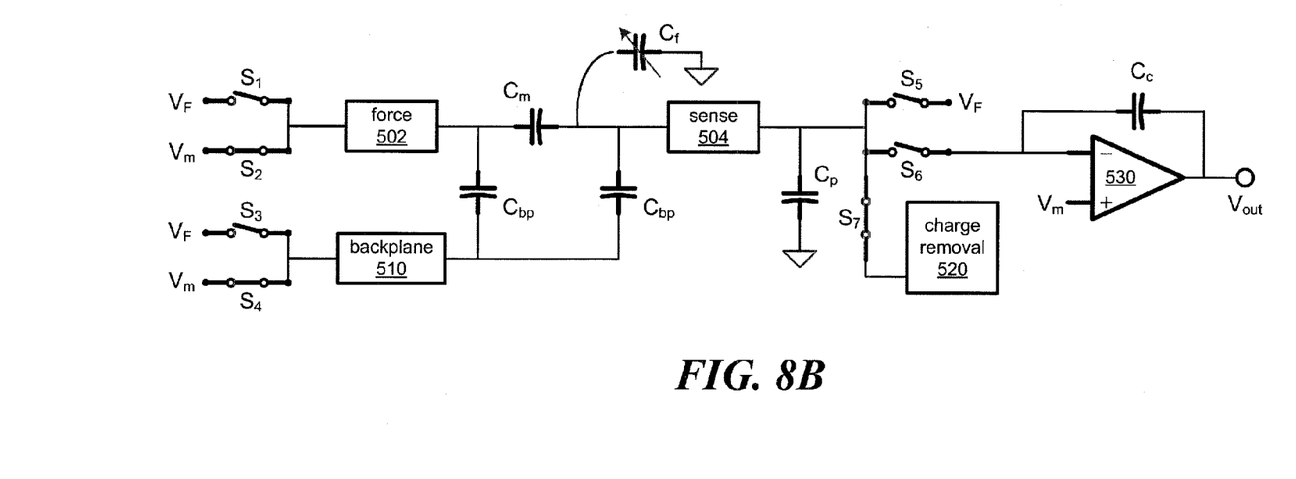
Figure 8C:
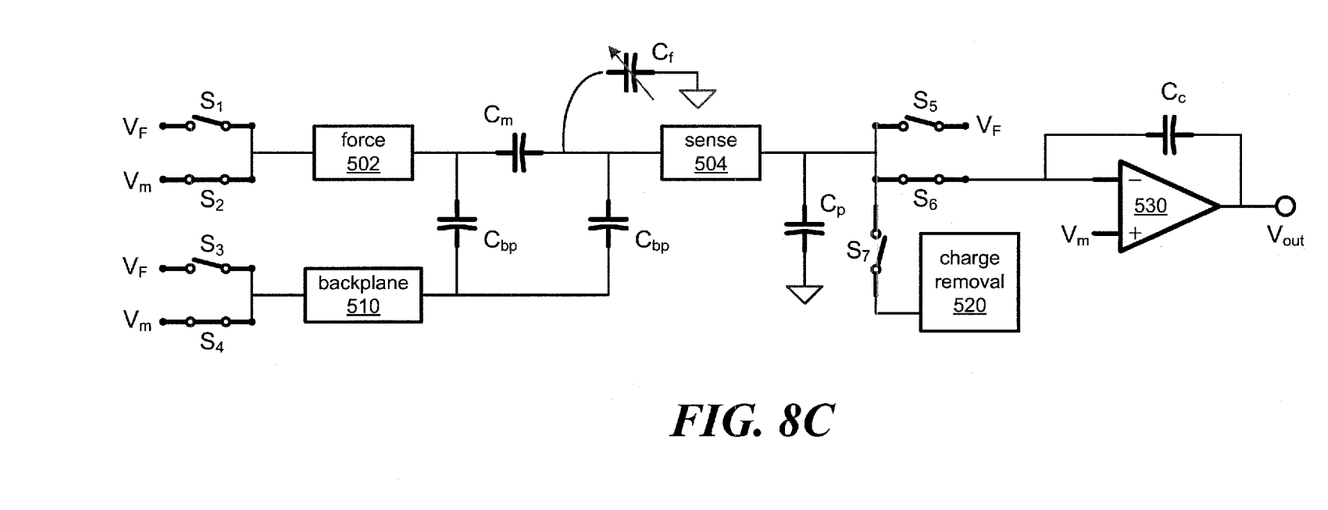

FIGS. 8A-8C depict an embodiment of pre-charge and measurement phases that may be used to increase capacitance measurement signal levels, according to some implementations. FIG. 8A depicts a pre-charge phase that may be identical to the pre-charge phase shown in FIG. 5A. During a pre-charge phase a forcing voltage $V_F$ may be applied to a force channel, a panel backplane, and a sense channel, such that the voltage applied across each of capacitances $C_m$ and $C_{bp}$ is approximately zero.

A discharge phase, depicted in FIG. 8B, may be implemented after the pre-charge phase, according to some embodiments. During the discharge phase, switches $S_1$, $S_3$, and $S_5$ may be opened, and switches $S_2$, $S_4$, and $S_7$ closed. Switch $S_6$ to the amplifier remains open, so that the amplifier does not see any charge accumulated by parasitic capacitance $C_p$ during the pre-charge phase. With switch $S_7$ closed, compensating charge $Q_n$ may be removed from parasitic capacitance $C_p$.

In a measurement phase, depicted in FIG. 8C, switch $S_7$ may open at substantially the same time switch $S_6$ closes. The changing of switch configurations for the measurement phase may occur at approximately the same time or after the charge removal circuit 520 is configured to stop removing charge from capacitance $C_p$, (e.g., at or after a clock cycle corresponding to the end of count M with reference to EQ. 8). During the measurement phase, amplifier 530 will see substantially only the charge attributed to $C_f$, since charge has been removed from $C_p$. This allows a smaller value of capacitance to be used for $C_c$, and a higher gain to be obtained for amplifier 530.

The pre-charge, discharge, and measurement phases shown in FIGS. 8A-8C may cycle repeatedly for each force and sense channel in a touch-sensitive capacitive matrix. The cycling may be rapid, e.g., clocked at rates more than 5 kHz in some embodiments, more than 10 kHz in some embodiments, more than 50 kHz in some embodiments, more than 100 kHz in some embodiments, more than 500 kHz in some embodiments. In some implementations, the cycling may be in the megahertz or multi-megahertz ranges.

Figure 9:
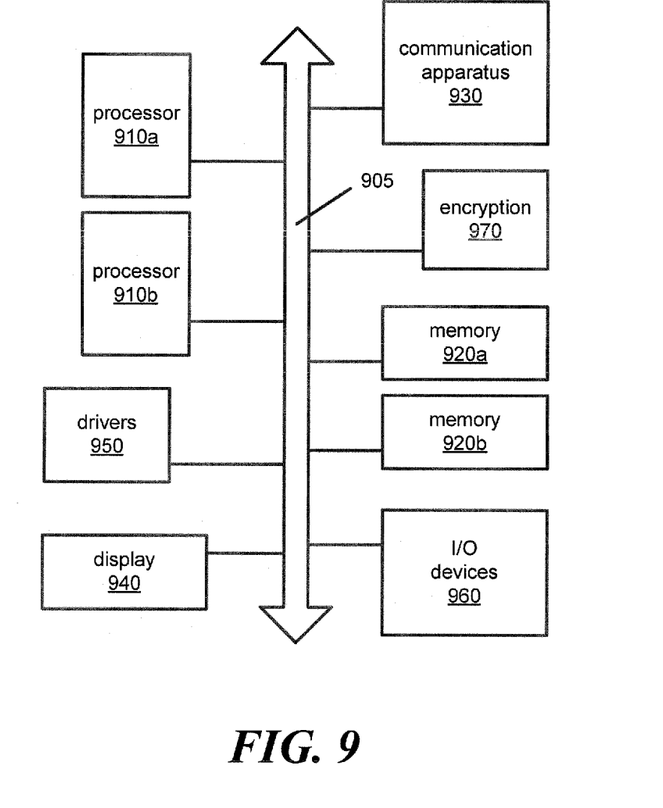
FIG. 9 depicts one embodiment of an electronic device in which a touch-sensitive capacitive matrix may be implemented.

An electronic device 100 (FIG. 1) that may include a touch-sensitive capacitive matrix may further comprise at least one processor 910a, 910b and related hardware, as depicted in FIG. 9. The processor may be configured to control and provide user interaction for operating the device. The at least one processor may be used in combination with control circuitry 400 to execute pre-charge, discharge, and measurement phases described above. The at least one processor may be used in combination with memory 920a, 920b to store count values M and/or other values related to parasitic capacitances for pixels of a touch-sensitive capacitive matrix. Other values stored may include, but are not limited to, gain values for the current mirror M2-M3 in the charge removal circuit 520 and time values $T_{on}$ for removing charge.

According to some embodiments, a processor 910a, 910b may comprise any type and form of data processing device, e.g., any one or combination of a microprocessor, microcontroller, a digital signal processor, and a field-programmable gate array (FPGA). There may be more than one processor in the system in some embodiments, e.g., dual core or multi-core processors, or plural processors communicating with at least one controlling processor. In some cases, there may be a combination of processor types, e.g., a microprocessor and one or more FPGAs. In some embodiments, pre-charge, discharge, and measurement phase operation for the capacitive matrix may be controlled by a dedicated FPGA.

When in operation, an operating system may execute on at least one processor and provide for user interaction and operation of the electronic device 100, which may include running multiple software applications and/or programs on the device. The memory may include any type and form of RAM-type memory device and ROM-type memory device.

The electronic device may further include a display 940 (e.g., comprising any one or combination of a video monitor, an LCD display, a plasma display, an alpha-numeric display, LED indicators, etc.). The electronic device 100 may further include one or more input/output devices 960 (e.g., keyboard, touchpad, buttons, switches, touch screen, microphone, speaker, printer), and communication apparatus 930 (e.g., networking software, networking cards or boards, wireless transceivers, and/or physical sockets). The electronic device 100 may include device drivers, e.g., software modules specifically designed to execute on the one or more processor(s) and adapt the processor(s) to communicate with and control system components. In some embodiments, the device includes encryption/decryption hardware and/or software 970 that may be used to encrypt selected outgoing data transmissions and decrypt incoming encrypted data transmissions. Components of the electronic device 100 may communicate over a bus 905 that carries data and control signals between the components. The bus may provide for expansion of the system to include other components not shown in FIG. 9.

Although the embodiments described above are explained primarily with respect to touch-sensitive capacitive matrices, aspects of the embodiments may be applied to other devices that employ capacitive measurements. For example, aspects of the embodiments may be applied to pressure sensors, movement sensors, accelerometers, and other sensors that are based on capacitive sensing.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An electronic device comprising:
    a touch-sensitive capacitive matrix having a plurality of force channels and a plurality of sense channels that are used for capacitive measurements to detect touch of the touch-sensitive capacitive matrix;
    an output amplifier configured to be coupled to and decoupled from at least one sense channel of the plurality of sense channels;
    wherein said at least one sense channel includes a parasitic capacitance; and
    a charge removal circuit including a discharge circuit configured to sink a constant magnitude current from the parasitic capacitance at said at least one sense channel for a duration of time so as to cancel a parasitic charge stored by said parasitic capacitance at said at least one sense channel.

2. The electronic device of claim 1, wherein the touch-sensitive capacitive matrix is incorporated in a display screen to form a touch screen.

3. The electronic device of claim 1, wherein the output amplifier is configured to provide an output signal representative of a change in capacitance due to a touching of the touch-sensitive capacitive matrix.

4. The electronic device of claim 1, wherein the output amplifier comprises:
    a non-inverting input coupled to a first reference voltage;
    an inverting input configured to receive a signal from the at least one sense channel; and
    a first capacitor connected between the inverting input and an output of the output amplifier.

5. The electronic device of claim 1, wherein the charge removal circuit comprises a switch for connecting and disconnecting a transistor current source to and from the at least one sense channel for said duration of time.

6. The electronic device of claim 1, wherein the charge removal circuit comprises a current mirror including a transistor current source, wherein a first transistor of the current mirror is shared by the transistor current source for each of the plurality of sense channels to remove the parasitic charge from parasitic capacitances associated with more than one sense channel.

7. The electronic device of claim 6, further comprising a switch configured to connect said transistor current source of the current mirror with a sense channel of the more than one sense channels.

8. The electronic device of claim 6, further comprising:
    a second transistor coupled between the first transistor and a first supply; and
    a supply amplifier having an output coupled to a gate node of the second transistor.

9. The electronic device of claim 8, wherein an inverting input of the supply amplifier is coupled to a node between the second transistor and the first supply.

10. The electronic device of claim 1, wherein the charge removal circuit comprises:
    a current mirror having a first transistor and a transistor current source, wherein a conduction terminal of the first transistor of the current mirror is coupled to receive a switch current output from a switched-capacitive supply circuit, said constant magnitude current derived from the switch current; and
    a first switch coupled between the transistor current source and the at least one sense channel.

11. The electronic device of claim 10, wherein the switched-capacitive supply circuit comprises:
    a second switch;
    a third switch coupled in series with and between the second switch and the first transistor; and
    a switched capacitor coupled to a node between the second switch and the third switch.

12. The electronic device of claim 11, wherein the second switch and third switch are respectively driven by a first pulse signal and a second pulse signal of opposite phase.

13. The electronic device of claim 12, wherein the second and third switches are driven at a same clock frequency and the first switch is controlled to be in an on state for a time duration determined by the same clock frequency.

14. A method for measuring capacitance at a sense channel of an electronic device wherein a parasitic capacitance is associated with the sense channel, the method comprising:
applying a first voltage to the sense channel;
executing a calibration measurement to determine a value of the parasitic capacitance;
determining a value of a compensating charge based at least in part on the determined value of the parasitic capacitance and the applied first voltage; and
connecting a discharge circuit to the sense channel for a duration of time to sink a constant magnitude current from the parasitic capacitance and generate said compensating charge which cancels a parasitic charge stored by the parasitic capacitance at said sense channel.

15. The method of claim 14, wherein the sense channel is a sense channel of a touch-sensitive capacitive matrix and the measured capacitance is a capacitance induced by an object touching the touch-sensitive capacitive matrix.

16. The method of claim 14, further comprising determining a value for the duration of time based upon the determined value of the compensating charge and a value of the constant magnitude current.

17. The method of claim 14, wherein connecting comprises:
applying the constant magnitude current to the sense channel for a selected number of cycles of an internal clock signal of the electronic device that is equal to said duration of time; and
capacitively switching a supply voltage to the current source at a same frequency as the internal clock signal.

18. The method of claim 14, further comprising:
applying a second voltage to the sense channel; and
connecting an amplifier to the sense channel to amplify an output from the sense channel and provide an output voltage representative of sensed capacitance by the sense channel.

19. The method of claim 18, wherein the acts of connecting a current source, applying a second voltage, and connecting an amplifier are initiated at substantially the same time.

20. The method of claim 18, wherein connecting a current source occurs during a time interval after the act of applying a first voltage has concluded and before the acts of applying a second voltage, and connecting an amplifier are initiated.

21. An electronic device comprising:
a sense channel configured to be coupled to a touch-sensitive capacitive matrix, wherein the sense channel has a parasitic capacitance;
an output amplifier having an input selectively connected to the sense channel and configured to convert a sensed capacitance to an output voltage; and
a discharge circuit selectively connected to the sense channel and configured to sink a constant magnitude current from the parasitic capacitance at the sense channel for a time period having a selected length so as to discharge a parasitic charge stored by said parasitic capacitance.

22. The electronic device of claim 21, wherein the discharge circuit comprises a switch for connecting and disconnecting a transistor current source to and from the sense channel for said duration of time.

23. The electronic device of claim 21, wherein the discharge circuit comprises a current mirror including a transistor current source, wherein a first transistor of the current mirror is shared by the transistor current source for each sense channel of a plurality of sense channels to remove the parasitic charge from parasitic capacitances associated with more than one sense channel.

24. The electronic device of claim 23, further comprising a switch configured to connect said transistor current source of the current mirror with the sense channel.

25. The electronic device of claim 23, further comprising:
a second transistor coupled between the first transistor and a first supply; and
a supply amplifier having an output coupled to a gate node of the second transistor.

26. The electronic device of claim 25, wherein an inverting input of the supply amplifier is coupled to a node between the second transistor and the first supply.

27. The electronic device of claim 21, wherein the discharge circuit comprises:
a current mirror having a first transistor and a transistor current source, wherein a conduction terminal of the first transistor of the current mirror is coupled to receive a switch current output from a switched-capacitive supply circuit, said constant magnitude current derived from the switch current; and
a first switch coupled between the transistor current source and the at least one sense channel.

28. The electronic device of claim 27, wherein the switched-capacitive supply circuit comprises:
a second switch;
a third switch coupled in series with and between the second switch and the first transistor; and
a switched capacitor coupled to a node between the second switch and the third switch.

29. The electronic device of claim 28, wherein the second switch and third switch are respectively driven by a first pulse signal and a second pulse signal of opposite phase.

30. The electronic device of claim 29, wherein the second and third switches are driven at a same clock frequency and the first switch is controlled to be in an on state for a time duration determined by the same clock frequency.

* * * * *

UNITED STATES PATENT AND TRADEMARK OFFICE
CERTIFICATE OF CORRECTION

| | | |
|---|---|---|
| PATENT NO. | : 9,665,215 B2 | Page 1 of 1 |
| APPLICATION NO. | : 13/853887 | |
| DATED | : May 30, 2017 | |
| INVENTOR(S) | : Sze-Kwang Tan et al. | |

It is certified that error appears in the above-identified patent and that said Letters Patent is hereby corrected as shown below:

In the Specification

At Column 6, Line number 3, please replace the phrase [[In some cases, can be]] with the phrase -- In some cases, $Q_n$ can be --.

At Column 7, Line number 28, please replace the phrase [[capacitors C, having]] with the phrase -- capacitors $C_x$, having --.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*